(12) United States Patent
Itagi et al.

(10) Patent No.: US 7,773,330 B2
(45) Date of Patent: Aug. 10, 2010

(54) APPARATUS FOR EXCITATION, ENHANCEMENT, AND CONFINEMENT OF SURFACE ELECTROMAGNETIC WAVES FOR CONFINED OPTICAL POWER DELIVERY

(75) Inventors: Amit Itagi, Pittsburgh, PA (US); Daniel D. Stancil, Mars, PA (US); Tuviah E. Schlesinger, Mt. Lebanon, PA (US); James A. Bain, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 902 days.

(21) Appl. No.: 11/106,980

(22) Filed: Apr. 15, 2005

(65) Prior Publication Data

US 2006/0232869 A1    Oct. 19, 2006

(51) Int. Cl.
*G11B 5/02* (2006.01)
(52) U.S. Cl. .............................. 360/59; 360/60; 360/62; 369/13.32; 369/13.33
(58) Field of Classification Search .................... 360/31, 360/59, 60, 62, 66
See application file for complete search history.

(56) References Cited

U.S. PATENT DOCUMENTS

| | | | | |
|---|---|---|---|---|
| 5,729,641 A * | 3/1998 | Chandonnet et al. | ........... | 385/2 |
| 5,768,459 A * | 6/1998 | Wolter et al. | ................... | 385/88 |
| 6,016,290 A * | 1/2000 | Chen et al. | .............. | 369/13.17 |
| 6,574,379 B2 * | 6/2003 | Miyazaki | ....................... | 385/1 |
| 6,757,313 B1 * | 6/2004 | Connolly et al. | ........ | 372/46.015 |
| 6,944,101 B2 * | 9/2005 | Johns et al. | .............. | 369/13.13 |
| 6,944,112 B2 * | 9/2005 | Challener | ............... | 369/112.27 |
| 6,975,580 B2 * | 12/2005 | Rettner et al. | ................ | 369/300 |
| 6,982,844 B2 * | 1/2006 | Rettner et al. | .................. | 360/59 |
| 6,999,384 B2 * | 2/2006 | Stancil et al. | ............. | 369/13.32 |
| 7,042,810 B2 * | 5/2006 | Akiyama et al. | .......... | 369/13.33 |
| 2003/0112542 A1 * | 6/2003 | Rettner et al. | .................. | 360/59 |
| 2003/0184903 A1 * | 10/2003 | Challener | ..................... | 360/59 |
| 2004/0062152 A1 * | 4/2004 | Stancil et al. | ........... | 369/112.27 |
| 2004/0062503 A1 * | 4/2004 | Challener | .................... | 385/129 |
| 2004/0081031 A1 * | 4/2004 | Saga et al. | ................ | 369/13.33 |
| 2004/0174918 A1 * | 9/2004 | Kwak et al. | .................... | 372/46 |
| 2004/0240327 A1 * | 12/2004 | Sendur et al. | ............. | 369/13.35 |
| 2005/0041950 A1 * | 2/2005 | Rottmayer et al. | .......... | 385/147 |
| 2005/0190496 A1 * | 9/2005 | Hamann et al. | ............. | 360/128 |
| 2005/0213912 A1 * | 9/2005 | Aalto | ......................... | 385/129 |

OTHER PUBLICATIONS

S. H. Charap et al., "Thermal Stability of Recorded Information at High Densities", *IEEE Trans. On Magn.*, vol. 33, No. 1, Jan. 1997, pp. 978-983.

(Continued)

*Primary Examiner*—Dismery E Mercedes
(74) *Attorney, Agent, or Firm*—Robert P. Lenart, Esq.; Pietragallo Gordon Alfano Bosick & Raspanti, LLP

(57) ABSTRACT

An apparatus for producing an optical spot on the order of 25 nm in a recording media. The apparatus includes an optical transducer comprising a waveguide which defines an aperture adjacent to an air bearing surface of the transducer adjacent a recording media. The transducer includes a protrusion extending beyond the plane of the air bearing surface extending toward the recording media.

20 Claims, 10 Drawing Sheets

OTHER PUBLICATIONS

G.S. Kino, "Fields Associated With The Solid Immersion Lens", *SPIE Conference on Far and Near Field Optics: Physics and Information Processing* (San Diego, CA), vol. 3467, Jul. 1998, pp. 128-137.

J. J. M. Ruigrok et al., "Disk Recording Beyond 100 Gb/in.$^2$: Hybrid Recording?" (invited), *Journal of Applied Physics*, vol. 87, No. 9, May 2000, pp. 5398-5403.

T. Rausch et al., "Near Field Hybrid Recording With a Mode Index Waveguide Lens", *Proceedings of SPIE*, Int. Soc. Opt. Eng. (USA), vol. 4090, (2000), pp. 1-6.

X. Shi et al., "A Nano-Aperture With 1000X Power Throughput Enhancement For Very Small Aperture Laser System (VSAL)", *Proceedings of SPEI*, vol. 4342 (2002), pp. 320-327.

T. E. Schlesinger et al., "An Integrated Read/Write Head For Hybrid Recording", *Jpn. J. Appl. Phys.*, vol. 41, Part 1, No. 3B, Mar. 2002, pp. 1821-1824.

X. Shi et al., "Ultrahigh Light Transmission Through A C-Shaped Nanoaperture", *Optics Letters*, vol. 28, No. 15, Aug. 2003, pp. 1320-1322.

W. A. Challener et al., "Light Delivery Techniques for Heat-Assisted Magnetic Recording" *Jpn. J. Appl. Phys.*, vol. 42, Part 1, No. 2B, Feb. 2003, pp. 981-988.

K. Ueyanagi et al., "Fabrication Of A Hemi-Paraboloidal Solid Immersion Mirror And Designing Of An Optical Head With The Mirror", *Jpn. J. Appl. Phys.*, vol. 42, Part 1, No. 2B, Feb. 2003, pp. 898-903.

A. V. Itagi et al., "Refraction Theory for Planar Waveguides: Modeling of a Mode Index Integrated Solid Immersion Lens", *Jpn. J. Appl. Phys.*, vol. 42, Part 1, No. 2B, Feb. 2003, pp. 740-749.

A. V. Itagi et al., "Ridge Waveguide As A Near-Field Optical Source", *Applied Physics Letters*, vol. 83, No. 22, Dec. 2003, pp. 4474-4476.

A. V. Itagi, "Virtual Optical Recording System", Thesis/Doctor Of Philosophy In Electrical And Computer Engineering—Carnegie Mellon University, Apr. 2003, pp. 1-215.

* cited by examiner

US 7,773,330 B2

APPARATUS FOR EXCITATION, ENHANCEMENT, AND CONFINEMENT OF SURFACE ELECTROMAGNETIC WAVES FOR CONFINED OPTICAL POWER DELIVERY

STATEMENT REGARDING FEDERALLY SPONSORED RESEARCH OR DEVELOPMENT

This invention was made with the United States Government support under Agreement No. 70NANB1H3056 awarded by the National Institute of Standards and Technology (NIST). The United States Government has certain rights in the invention.

FIELD OF THE INVENTION

The invention relates to an apparatus for transferring electromagnetic radiation, and more particularly to an apparatus for delivering optical energy to a recording medium.

BACKGROUND INFORMATION

Heat assisted magnetic recording (HAMR) generally refers to the concept of locally heating a recording medium to reduce the coercivity of the recording medium so that the applied magnetic writing field can more easily direct the magnetization of the recording medium during the temporary magnetic softening of the recording medium caused by the heat source. Heat assisted magnetic recording allows for the use of small grain media, which is desirable for recording at increased areal densities, with a larger magnetic anisotropy at room temperature to assure sufficient thermal stability. By heating the medium, the material's magnetic crystalline anisotropy energy density or the coercivity is reduced such that the magnetic write field is sufficient to write to the medium. Once the medium cools to ambient temperature, the medium has a sufficiently high value of coercivity to assure thermal stability of the recorded information.

With the advent of such technologies, storage densities of about 1 Tbit/in$^2$ and beyond have become highly desirable. In order to effectively create such densities, the storage media must be heated by a focused optical spot in a highly localized area. Theoretical methods of creating storage densities of up to 1 Tbit/in$^2$ would require an optical spot having a diameter of about 25 nm. Optical spots having a diameter of about 25 nm are typically an order of magnitude smaller than optical spots that can be achieved by traditional diffraction-limited optical systems. Accordingly, traditional optical spots are too wide to achieve recording densities approaching 1 Tbit/in$^2$.

Sub-wavelength apertures have been suggested as a way of achieving very small optical spots. However, the energy of an optical spot produced by a sub-wavelength aperture is not capable of effectively propagating through the sub-wavelength aperture, and the resulting energy throughput is very low. The resulting throughput energy must be sufficient to heat the media to sufficiently reduce coercivity. A 25 nm optical spot would need to deliver about 1 mW of power to effectively write to the media. Traditional apertures, including sub-wavelength apertures, cannot produce an optical spot having a diameter of about 25 nm capable of imparting sufficient power to the media.

Accordingly, there is a need for devices that can provide a reduced optical spot size with increased throughput efficiencies.

SUMMARY OF THE INVENTION

An aspect of the invention provides a transducer comprising a waveguide including a ridge and defining an aperture adjacent to a bottom surface defining a plane, and a protrusion extending from the ridge beyond the plane of the bottom surface.

Another aspect of the invention provides a disc drive system comprising a motor for rotating a storage media, an arm for positioning a recording head adjacent to a surface of the storage media, wherein the recording head comprises a write pole capable of transmitting electromagnetic radiation, a waveguide including a ridge and defining an aperture adjacent to an air bearing surface, and a protrusion extending from the ridge beyond the air bearing surface, and A source of electromagnetic waves for delivering an electromagnetic wave to the waveguide.

Yet another aspect of the invention provides a recording head comprising a write pole capable of transmitting electromagnetic radiation, a waveguide positioned in the write pole and including a ridge and defining an aperture adjacent to an air bearing surface, and a protrusion extending from the ridge beyond the air bearing surface.

DETAILED DESCRIPTION

Figure 1:
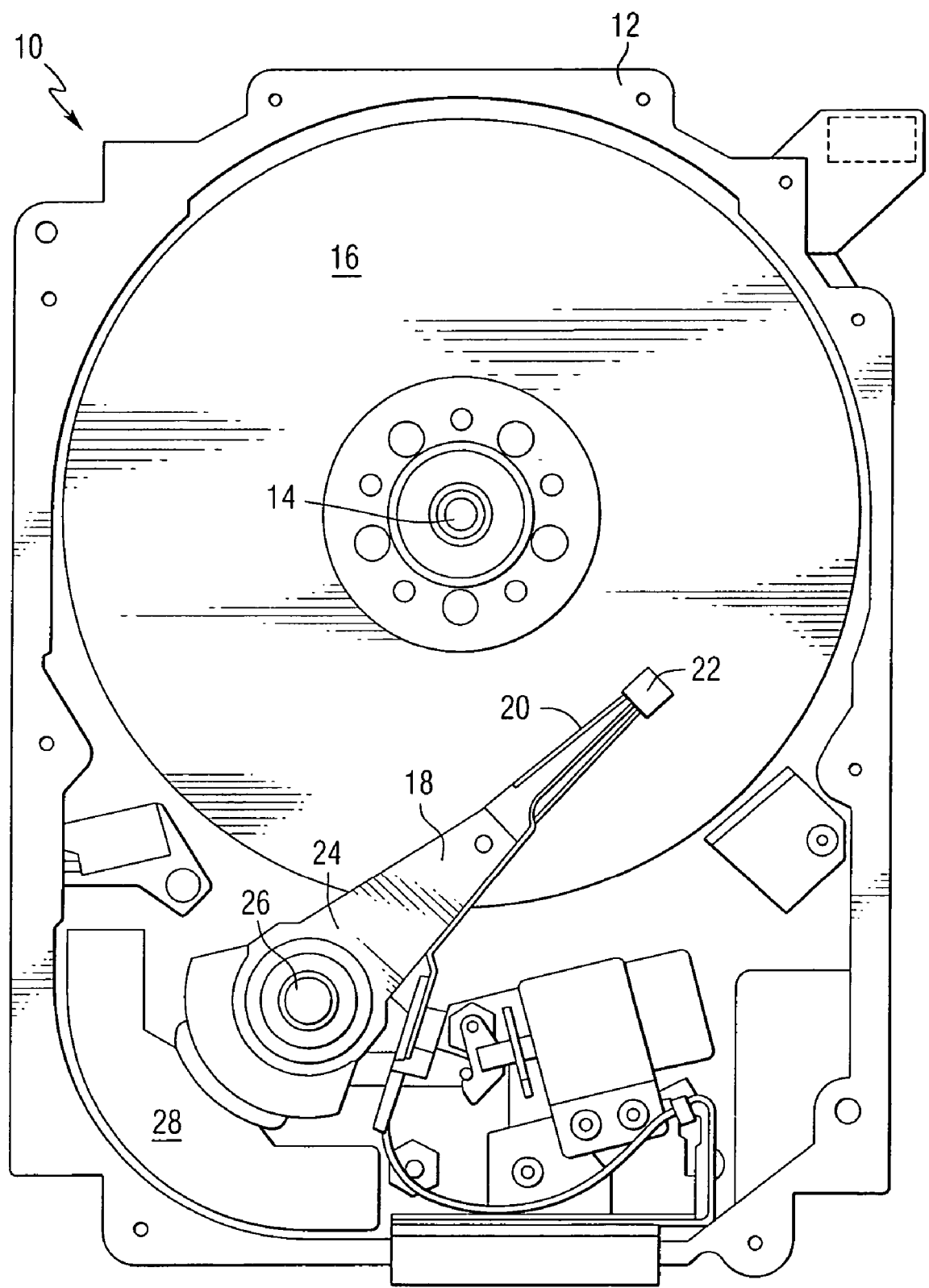
FIG. 1 is a plan view of a disc drive assembly that can be constructed in accordance with the invention.

This invention encompasses structures that can be used in recording heads for use with magnetic and/or optical recording media, as well as magnetic and/or optical recording heads that include such devices and disc drives that include the recording heads. FIG. 1 is a pictorial representation of a disc drive 10 that can utilize transducer assemblies constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well known in the art.

Figure 2:
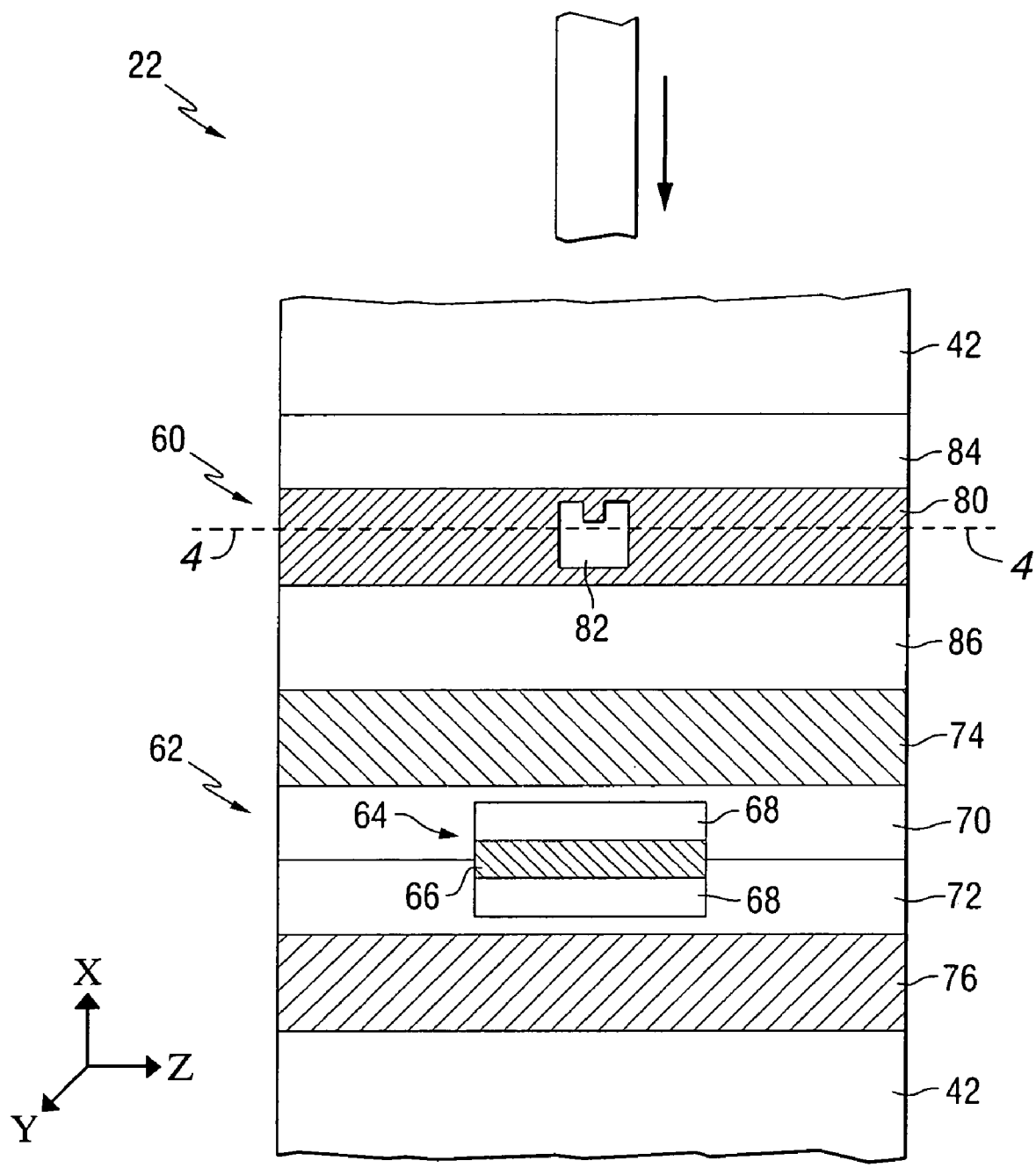
FIG. 2 is a plan view of a portion of an air-bearing surface (ABS) of a read/write head in accordance with the invention.

In heat assisted magnetic recording, an electromagnetic wave of, for example, visible, infrared, or ultraviolet light is directed onto a surface of a data storage media 16 to raise the temperature of a localized area of the media 16. This raised temperature facilitates switching of the magnetization in the localized area. FIG. 2 is a plan view of a portion of the air-bearing surface (ABS) 100 of the read/write head 22 in accordance with one example of the invention. The track 48 of the recording medium may move relative to the head 22 in the direction indicated by the arrow in FIG. 2. The head 22 may be separated in the y-direction (into and out of the drawing sheet) relative to the coordinate system shown in FIG. 2 from the recording media by an aerodynamically-determined flying distance. The read/write head 22 includes a write portion 60 and a read portion 62.

As shown in FIG. 2, recording or reading head 22 may comprise a read portion 62. Read portion 62 includes, for example, a magnetoresistive sensor 64, whose electrical resistance may change when subjected to a magnetic field produced by opposingly oriented flux regions (not shown) of the track 48. The read portion 62 may utilize, for example, a CIP (current in plane) configuration or a CPP (current perpendicular to plane) magnetoresistive sensor. The change in electrical resistance of the magnetoresistive sensor 64 may be sensed by a read circuit (not shown). In one example, the magnetoresistive sensor 64 may be a giant magnetoresistive (GMR) sensor, including at least one non-magnetic metal layer 66 sandwiched by two ferromagnetic layers 68. The non-magnetic metal layer 66 may be fabricated from an electrically conductive/magnetically non-conductive material such as copper, and the ferromagnetic layers 68 may be fabricated from a magnetic material such as a nickel-iron-copper (NiFeCo) composition.

The magnetoresistive sensor 64 may be located between first and second gap layers 70, 72, which are located between first and second shield layers 74, 76. The gap layers 70, 72 may include any material suitable for electrically isolating the conductive layers of the read/write head 40. In one example, the gap layers may comprise $Al_2O_3$ or $SiO_2$. The shield layers 74, 76 may be fabricated from a soft ferromagnetic material such as NiFe.

As shown in FIG. 2, the write portion 60 of the head 22 includes an electrically conductive strip 80 defining an aperture. The electrically conductive strip 80 may be fabricated from an electrically conductive material such as gold, copper, aluminum or silver. The aperture may be filled with a dielectric material 82 such as $Al_2O_3$, $SiO_2$, SiN or air. The electrically conductive strip 80 may conduct current from the write circuit of a recording head to thereby induce a magnetic field in a specific region of the media 16, having at least one track 48, to cause the grains in the media to properly align as part of the data writing process.

Figure 3:
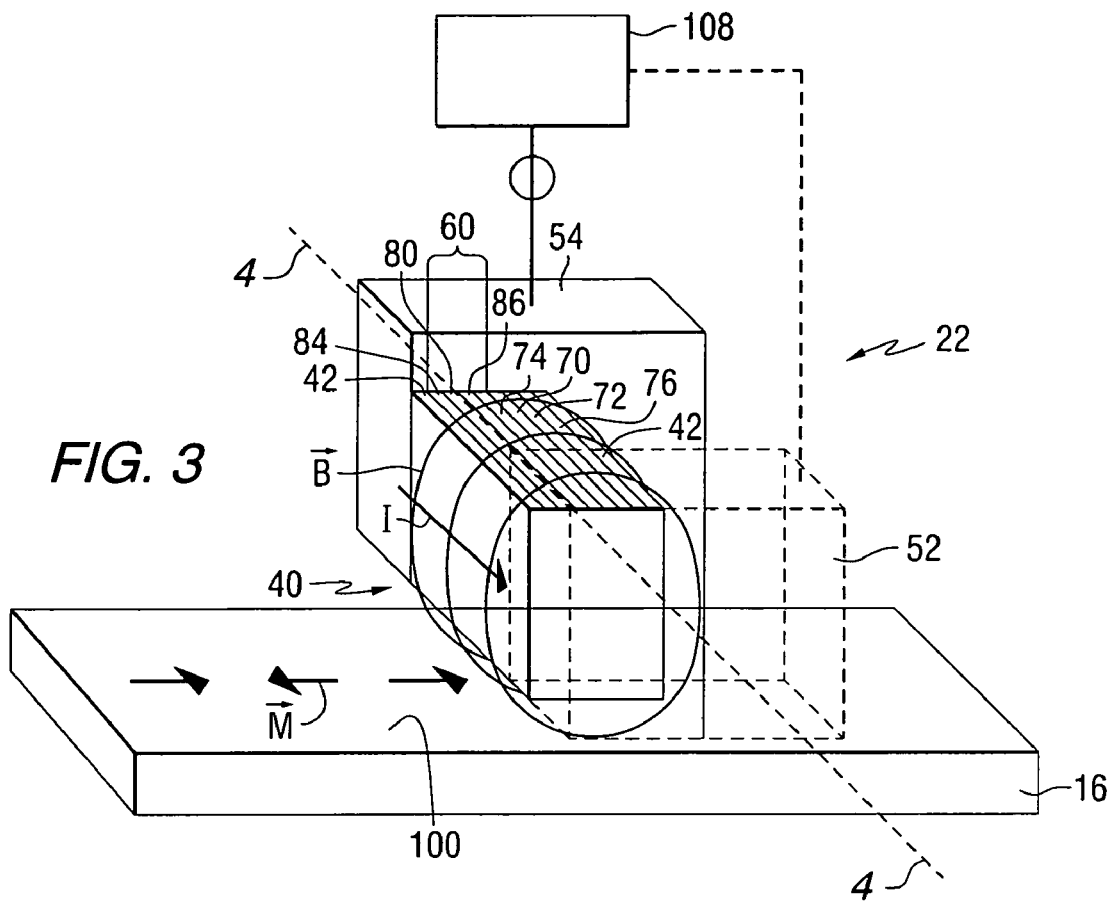
FIG. 3 is an isometric drawing of a longitudinal recording head in accordance with the invention.

FIG. 3 is a pictorial representation of a longitudinal recording head 22 constructed in accordance with the invention. The head 22 includes a linear conductor having a rectangular cross-section, as shown in FIG. 2, positioned between and electrically connected to two conductive heat sinks 52 and 54. The cross-sectional area of the heat sinks 52 and 54 is much greater than that of the conductor. A current source 108 supplies current to the heat sinks, and the conductor. In operation, the head 22 would be positioned adjacent to a magnetic recording media 16 and separated from the media 16 by an air bearing. Current in the conductor creates a magnetic field B that has sufficient strength to affect the magnetization of the magnetic recording media. The current density in the heat sinks 52 and 54 is typically much lower than the current density in the conductor 40.

As illustrated in FIG. 3, the write portion 60 may include isolating layers 84, 86 to electrically isolate the electrically conductive strip 80. The isolating layers 84, 86 may be fabricated from an electrically nonconductive material such as $Al_2O_3$ or $SiO_2$. The read/write head 22 may also include additional layers. As described in more detail hereinafter, a ridge waveguide may be shaped to provide an aperture for optical energy to propagate through during the writing process to heat the media 16.

Figure 4:
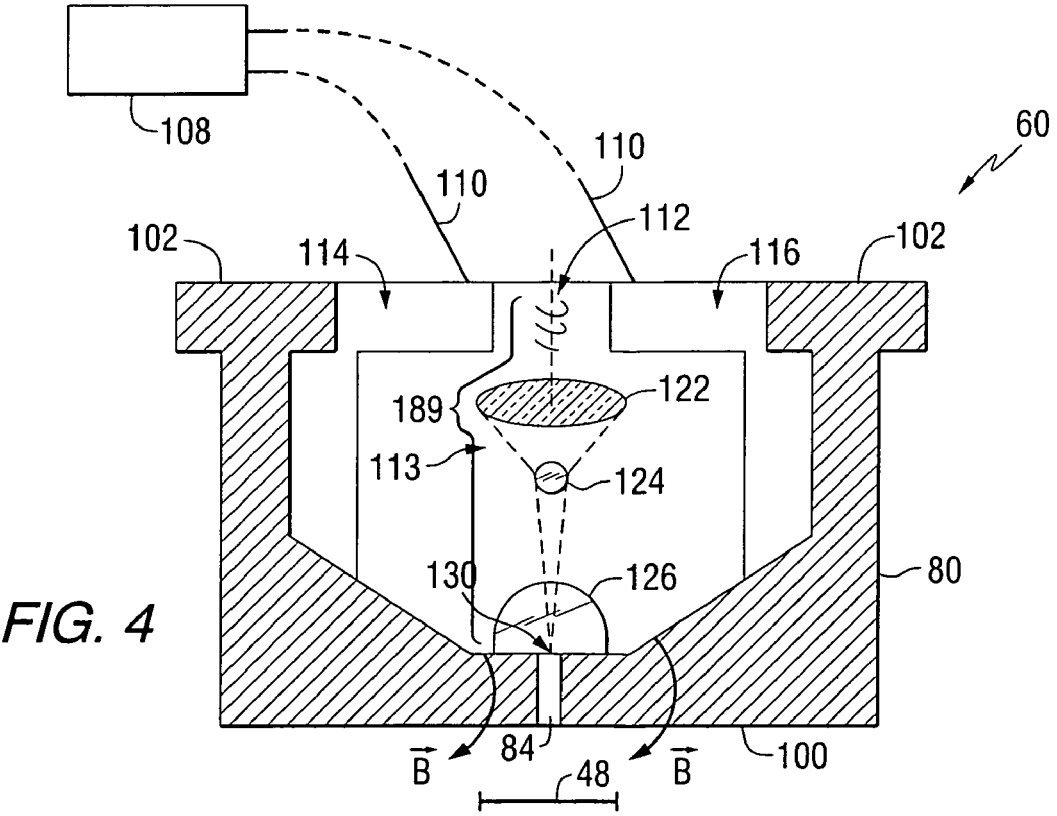
FIG. 4 is a cross-sectional view of the read/write head of FIG. 3 taken along line 4-4 in accordance with the invention.

FIG. 4 is a cross-sectional view of the write portion 60 of the recording head of FIG. 2, taken along line 4-4. As illustrated in FIG. 4, the electrically conductive strip 80 includes an air bearing surface (ABS) 100 that defines the aperture that may be filled with a dielectric 82. Electrical current may be supplied to the conductive strip 80 from a write circuit (not shown) coupled to lead portions 102 of the conductive strip 80. Current flowing through the conductive strip 80 induces a magnetic field B for writing to a track 48 of the magnetic recording media. If the read portion 62 is CIP, the magnetoresistive sensor 64 is oriented to carry current in the cross-track direction, shown in FIG. 2 as the z-direction, relative to the recording media 16.

In one example, the invention provides an optical transducer assembly 189 incorporated into the conductive strip 80 for heating the media to accommodate both writing and reading. The invention can include separate transducers for the writer and the reader. Each of the transducers can include a condenser, in the form of a waveguide, and a near field transducer. The waveguides 112 and 113 can be, for example, solid immersion lenses (SILs) or solid immersion mirrors (SIMs) and the near field transducers can be, for example, a ridge waveguide. Each waveguide and near field transducer design can be separately optimized for writing or read back. The optical transducers can couple electromagnetic radiation into the waveguides from which the energy can be directed toward the storage media.

Electromagnetic radiation from an optical energy source 108 may be directed onto and through the optical transducer 189 disposed in the conductive strip 80 to heat the magnetic media and reduce its coercivity, thus facilitating the writing process. The electromagnetic radiation can comprise ultraviolet, visible, infrared or x-ray radiation. The energy source 108 may comprise a laser such as a solid state laser. The energy source 108 may also be coupled to the conductive strip 80 by a prism coupler.

Electromagnetic radiation from the energy source 108 may be coupled to the optical transducer 189 by a fiber optic cable 110. Optical energy from the fiber optic cable 110 may propagate through a first optical waveguide channel 112, which may be formed, for example, by a thin film structure. The thin films may include a guiding layer of $SiN_x$ sandwiched between $SiO_2$ sidewall cladding layers. Optical energy carried by the fiber optic cable 110 may comprise multiple energy modes including transverse electric (TE) and transverse magnetic (TM) modes. The first optical waveguide channel 112 allows a single mode of the optical energy to propagate through the optical waveguide channel 112, effectively cutting-off propagation of higher order modes. After propagating through the first optical waveguide channel 112, the optical energy can propagate through a second optical waveguide 113. Optical waveguide 113 can comprise a lens system, including, for example, lenses 122, 124 and 126 to focus a spot 130 of the optical energy onto the media 16.

Figure 5:
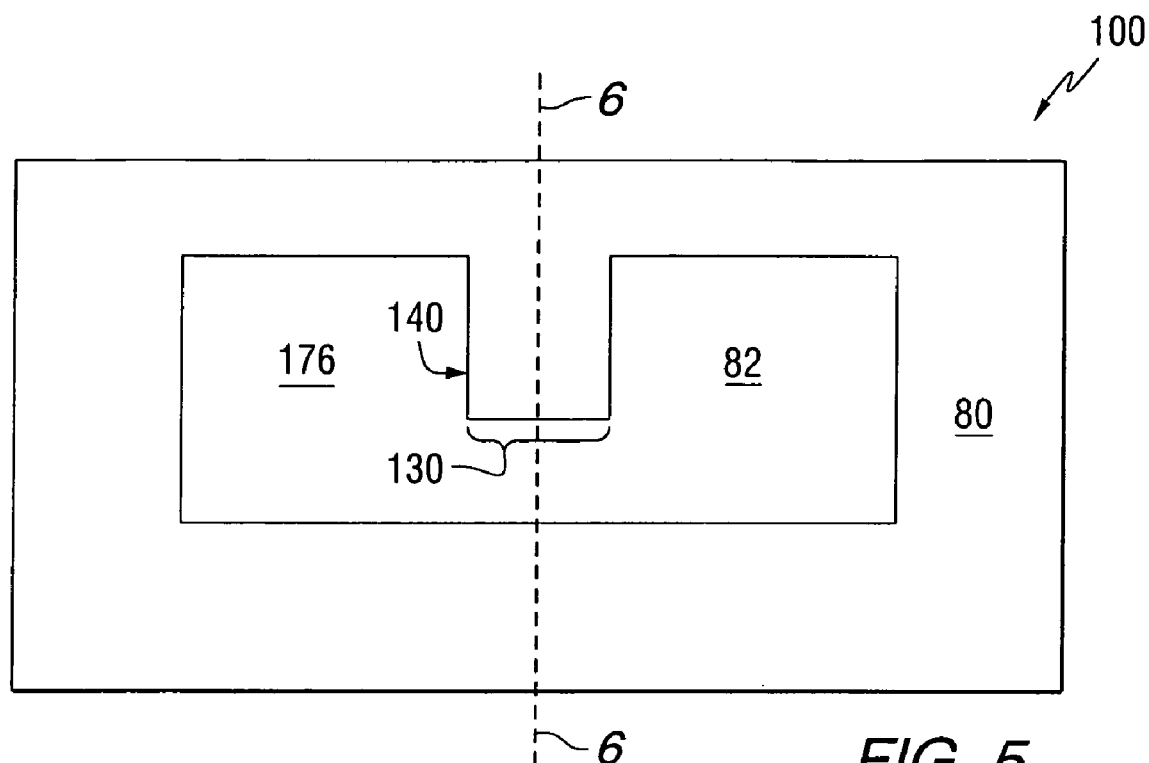
FIG. 5 is an end view of a ridge waveguide.

FIG. 5 is an end view of the ABS 100 of the electrically conductive strip 80. As illustrated, the aperture defined by ABS 100, with dielectric material 82 disposed therein, can provide a ridge waveguide for the optical energy from the fiber optic cable 110. The shape of the aperture, the dimensions of the aperture, and the wavelength of the incident energy may be chosen such that the lowest order ridge waveguide mode is not in cut-off, i.e., the optical energy is capable of propagating through the dielectric 82 and impinging on the track 48 of the recording media 16.

Although ridge waveguides have been previously advanced as a means of generating small optical spots, earlier work involving ridge waveguides failed to consider the electric and magnetic effects of the coupling of light onto the media itself. In order to fully analyze how light couples to the media, all components of the electric and magnetic fields must be evaluated, for example, the media couples differently to different spatial frequencies. In particular, magnetic media couples differently to transverse electric (TE) and transverse magnetic (TM) modes due to the different impedance mismatch for each of the modes. By altering the local geometry of the ridge waveguide in the coupling region, the characteristics of the coupling behavior are also altered.

For a typical ridge waveguide of the prior art, as shown in FIG. 5, the field intensity including the TE and TM modes in the aperture are concentrated in the region 130 below the ridge 140. Ridge waveguides typically exhibit a surface mode character at the surface that is in closest proximity to the media.

Figure 6:
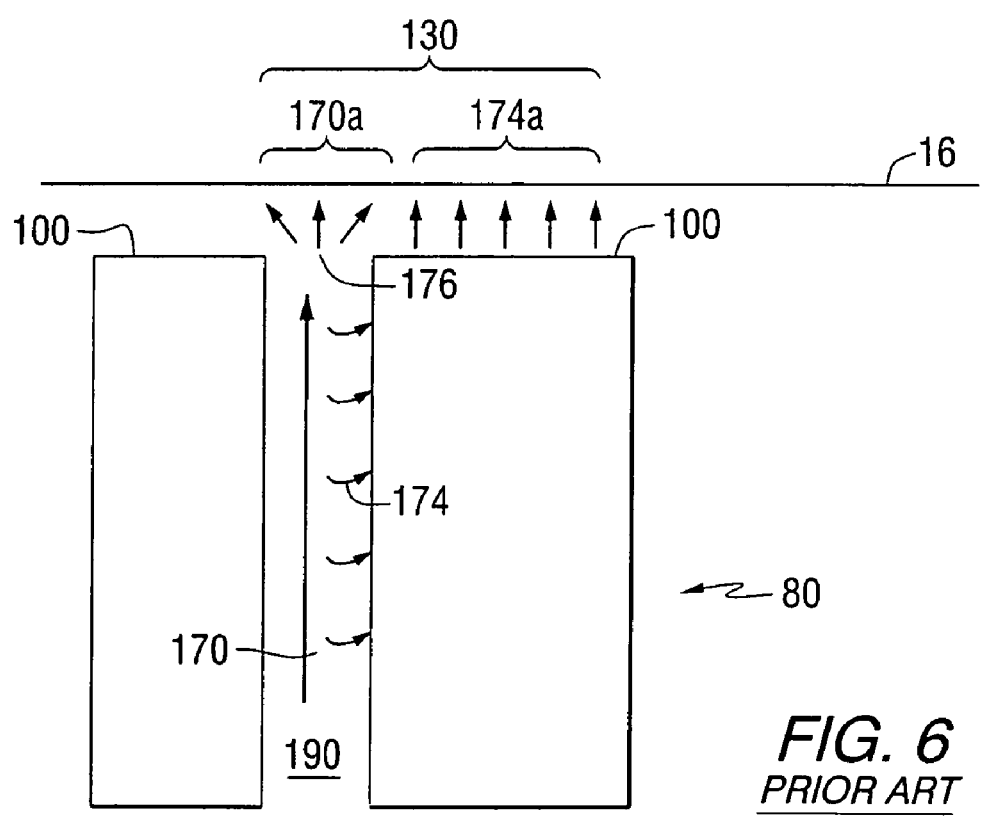
FIG. 6 is a cross-sectional view of the ridge waveguide of FIG. 5 taken along line 6-6.

FIG. 6 is a cross-sectional view of the prior art structure of FIG. 5 taken along line 6-6 passing through the mirror plane of symmetry of FIG. 5. The aperture 176 is in optical communication with the media 16 such that light traveling through the aperture 176 is directed onto the surface of the media 16 in a localized area. A beam of electromagnetic radiation from waveguides 112 and 113 passing through cavity 190 may be focused on the top surface of the media 16. Electromagnetic radiation from the beam spreads between the ABS 100 of the conductive strip 80 and the adjacent media 16. As shown in FIG. 6, the bulk modes of electromagnetic radiation including the TE mode and the superposition of free space propagating modes, passing through the waveguide are located in the region 130 under the ridge 140. As shown in FIG. 6, the bulk mode 170 exhibits a transverse electric (TE) field that spreads at the aperture 176 of the waveguide as illustrated by arrows 170a. These modes do not couple efficiently into the media 16 and therefore dissipate power. The associated surface waves exhibit TM character at the ridge surface and are indicated by arrows 174a. These surface waves excite a coupled waveguide mode between the media 16 and the air-bearing surface 100 of the ridge 140 as illustrated by arrows 174a. This resulting waveguide mode has a strong TM character and decays away from the desired excitation location at the optical spot 130. Accordingly, the optical spot 130 on the media 16 becomes spread out due to the power dissipation into the ridge waveguide material and the media.

Figure 7:
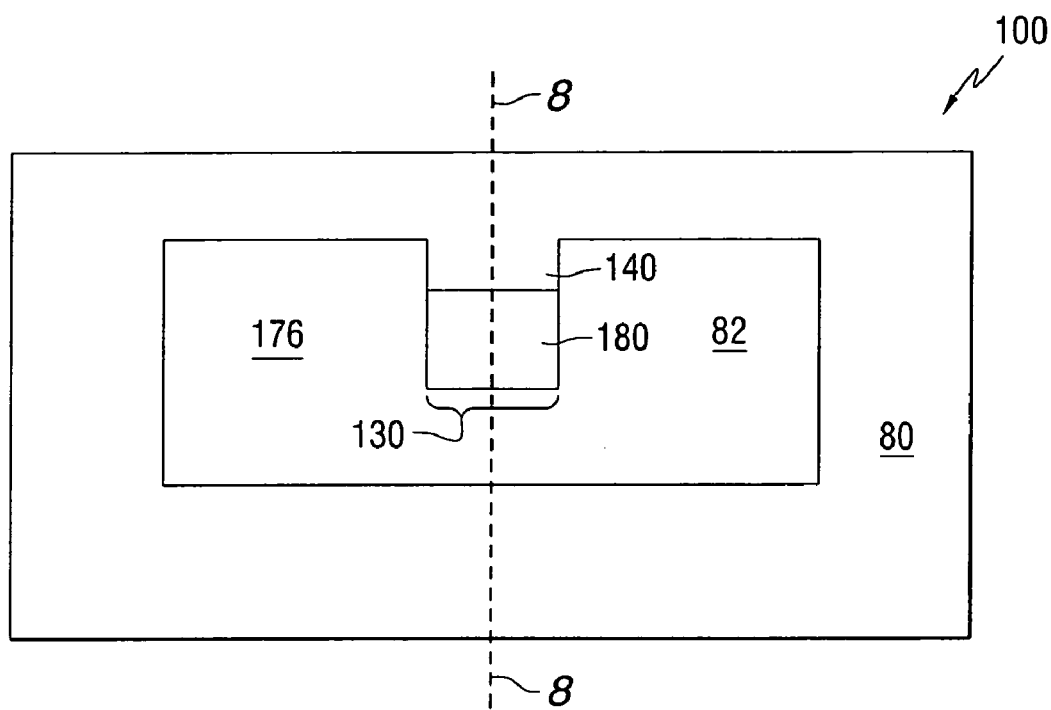
FIG. 7 is an end view of a ridge waveguide in accordance with the invention.
Figure 8:
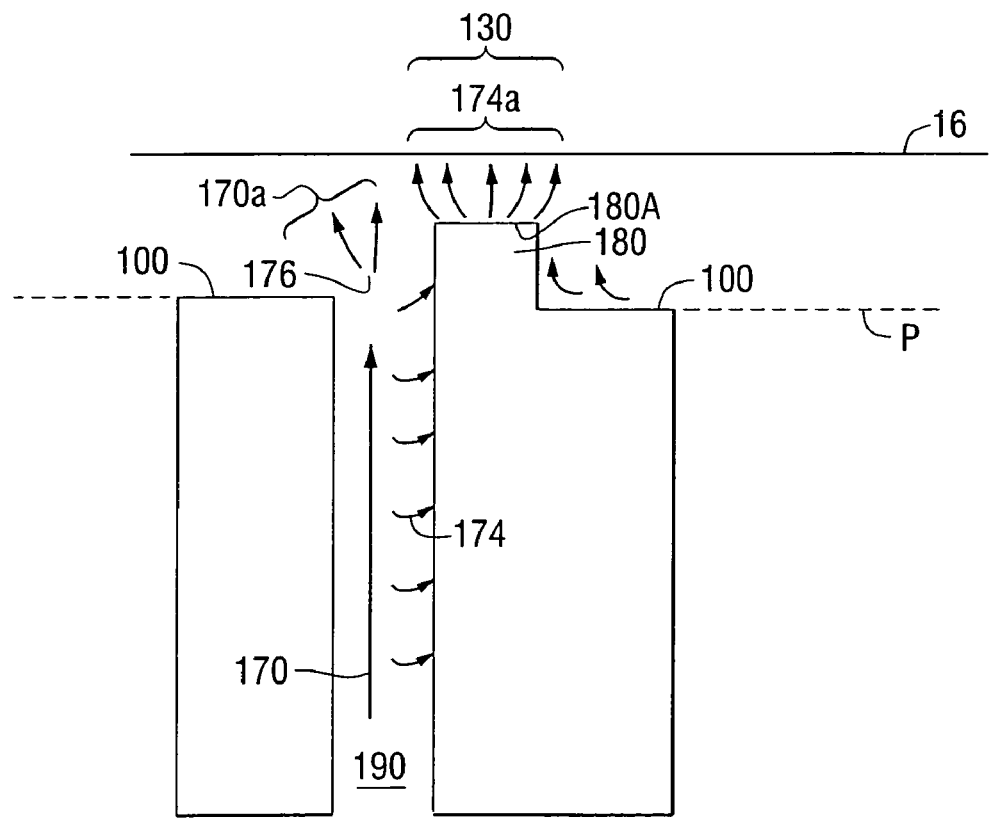
FIG. 8 is a cross-sectional view of the ridge waveguide of FIG. 7 taken along line 8-8 in accordance with the invention.

As shown in FIGS. 7 and 8, by modifying the aperture 176 of the ridge waveguide in accordance with an example of the invention, the optical spot 130 can remain focused as it impinges the media 16. As shown in FIGS. 7 and 8, a protrusion 180 of the ridge 140 is projected beyond a plane P running along the air-bearing surface 100 of the waveguide. The protrusion 180 is positioned at about the edge of the aperture 176 and extends toward the media 16.

The ridge waveguide mode or bulk mode 170 is directed to the aperture 176 and begins to diverge upon exiting the aperture 176 as shown by arrows 170a. The associated surface mode 174, exhibiting TM character, can excite surface modes 174a between the surface 180a of the protrusion 180 and the media 16. These surface modes 174a can couple with surface modes on the media 16, resulting in the efficient deposition of power into the media 16.

Figure 9A:
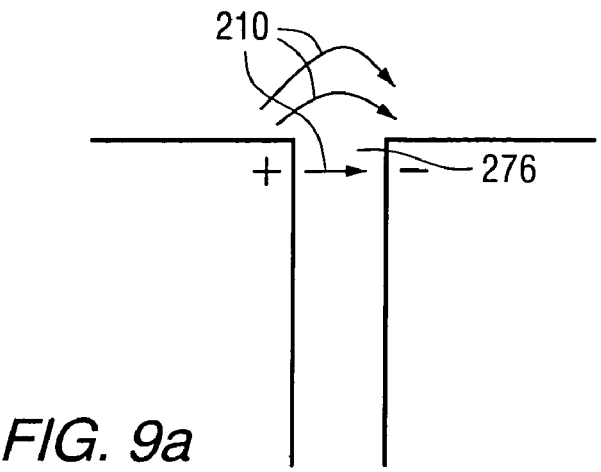
FIG. 9a is a partial section view of the protrusion of the ridge waveguide in accordance with the invention.
Figure 9B:
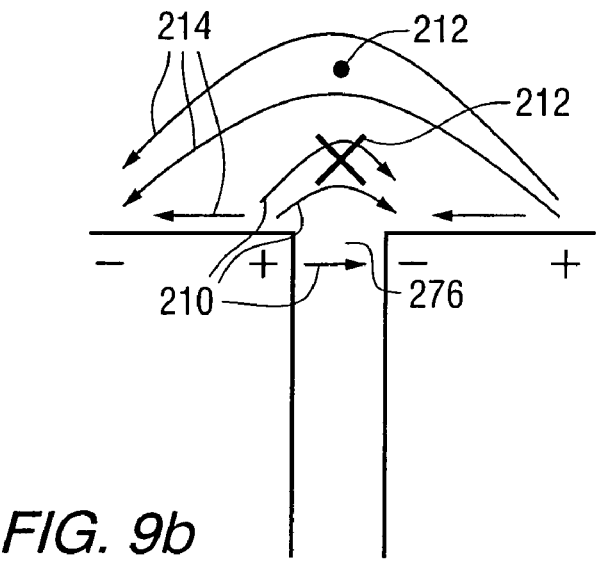
FIG. 9b is a partial section view of the protrusion of the ridge waveguide in accordance with the invention.
Figure 9C:
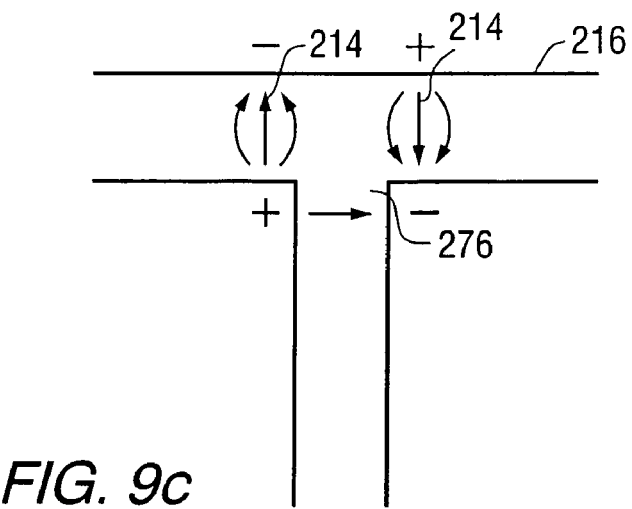
FIG. 9c is a partial section view of the protrusion of the ridge waveguide in accordance with the invention.
Figure 9D:
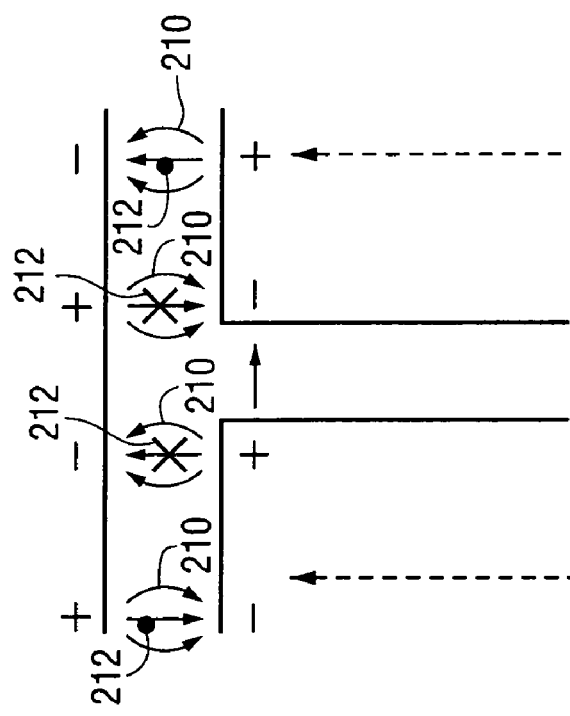
FIG. 9d is a partial section view of the protrusion of the ridge waveguide in accordance with the invention.
Figure 9D:
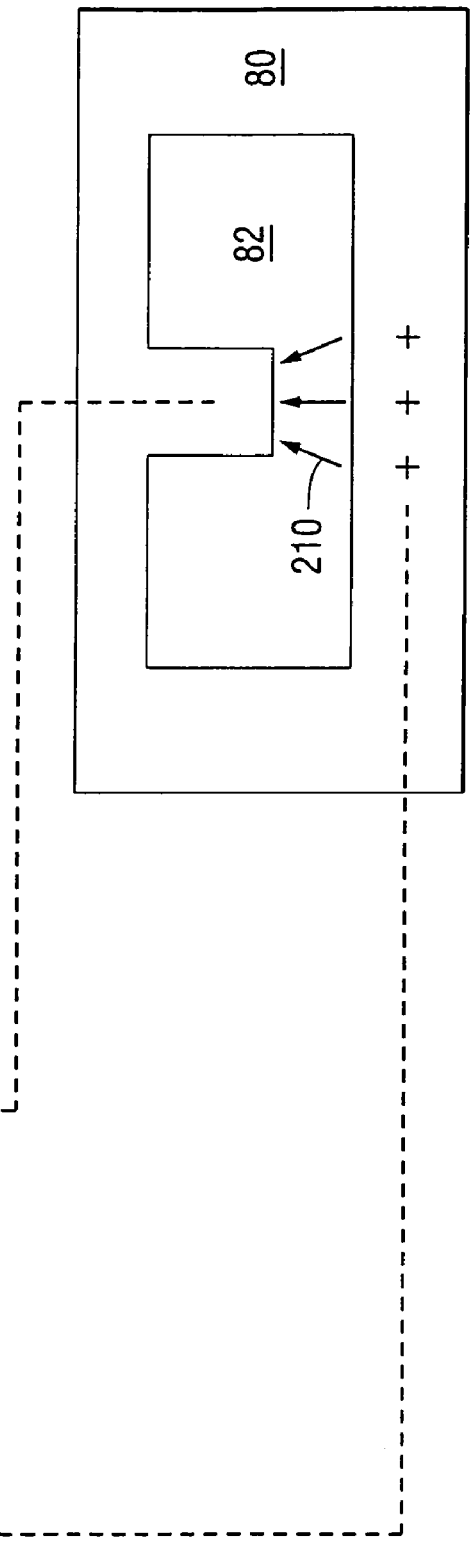
Figure 9E:
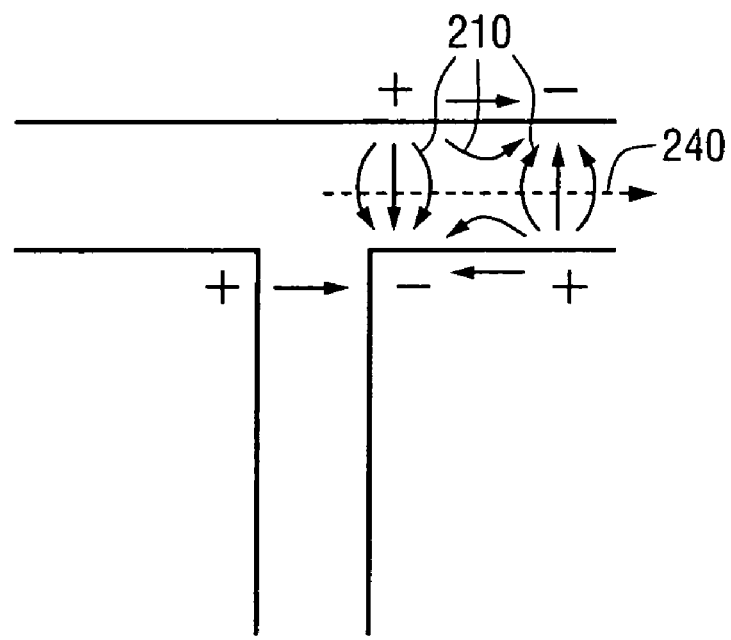
FIG. 9e is a partial section view of the protrusion of the ridge waveguide in accordance with the invention.
Figure 9F:
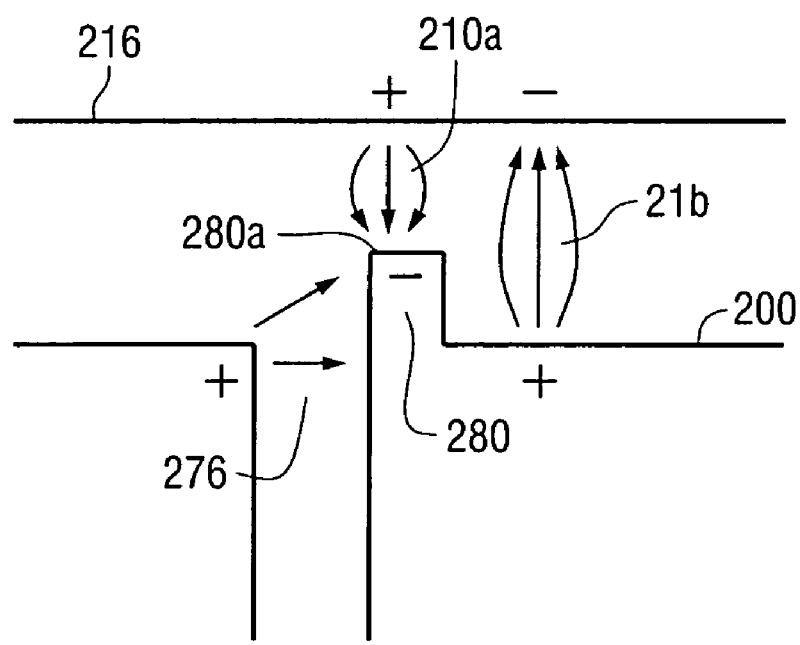
FIG. 9f is a partial section view of the protrusion of the ridge waveguide in accordance with the invention.

As shown in FIGS. 9a-f, the protrusion 180 limits the region over which the interaction between the aperture 276 and the media 216 take place. FIG. 9a shows the output of the aperture 276 having an induced charge which gives rise to an electric field 210. As shown in FIG. 9b, the electric field is oscillating and thereby gives rise to a magnetic field 212. The magnetic field oscillates thereby giving rise to a radiating field 214. When a medium 216 is positioned in near proximity to the aperture 276, as shown in FIG. 9c, opposite charges are induced due to the opposite sign of the real part of the permittivity. The magnitude of the permittivity of the metal is much larger than that of free space, accordingly, the field between the charges is mostly in the free space and not in the metal. As shown in FIG. 9d, the oscillating electric field generates a magnetic field which in turn generates an electric field. Thus, a mode is set up between the aperture 276 and the media. Some of the mode decays away from the source and dissipates into the metal. As shown in FIG. 9e, the mode has an associated electric field 210 substantially parallel to the media surface which dissipates energy into the media. In a perfect conductor, such parallel electric fields are not possible, however, they do occur in metals at optical frequencies. The mode having a direction of propagation 240 decays slowly thereby causing a large optical spot. As shown in FIG. 9f, the protrusion 280 limits the region over which the interaction between the aperture 276 and the media 216 takes place, thereby confining the optical spot in the media 216. The distance between the plane of the ABS 200 and the media 216 is greater than the distance between the protrusion 280 and the media 216. Therefore, the field 210a between the protrusion 280 and the media 216 is greater than the field 210b between the plane of the ABS 200 and the media 216.

The distance the protrusion 280 projects toward the media 216 is large enough that the surface waves along the plane extending along the ABS 200 and along the cavity do not readily couple into a waveguide mode except under the protrusion 280. In one example, the distance between the plane extending along the ABS 200 and the media 216 is an order of magnitude greater than the distance between the surface 280a of the protrusion 280 and the media 216. In one example, the distance from the surface 280a of the protrusion 280 and the media is from about 3 nm to about 10 nm. In another example, the distance from the surface 280a of the protrusion 280 and the media is about 5 nm. The protrusion can comprise a three-dimensional shape. In one example, the width of the protrusion 280 can be from about 10 nm to about 50 nm. In another example, the width of the protrusion 280 can be from about 20 nm to about 40 nm. The depth of the protrusion can be from about 10 nm to about 50 nm. In another example, the depth of the protrusion can be from about 20 nm to about 40 nm. However, the larger the area under the protrusion 280, the larger the optical spot becomes. Accordingly, the width and depth of the protrusion 280 should be sized to allow a sufficiently small optical spot to impinge on the media and to allow a sufficient amount of power to be provided to the media 216.

The surface waves excited on the media 216 surface decay quickly away from the protrusion 280 in the absence of sustained energy transfer from surface modes running along the air bearing surface. The protrusion 280 preferably projects toward the media 216 to an extent that the surface waves along the media and protrusion air bearing surface de-couple beyond the protrusion 280. The mode between the media 216 and the plane of the ABS 200 of the head has a surface wave character at both the ABS 200 and the media surface. The ridge fields excite the surface wave on the ABS 200 which transfers energy into the surface wave of the media. If the distance between the two surfaces is large, the two surface waves decouple and no energy is transferred into the media surface wave. Accordingly, the protrusion dimensions are selected to ensure that the region around the protrusion does not have good coupling, thereby confining the optical spot under the protrusion.

In one example, the protrusion comprises a metal having a negative real part of the permittivity at the frequency of interest or compounds that decompose on heating to form metal clusters. In another example, the protrusion comprises gold, silver, aluminum, copper, cobalt, platinum, silver oxide and/or platinum oxide.

Figure 10:
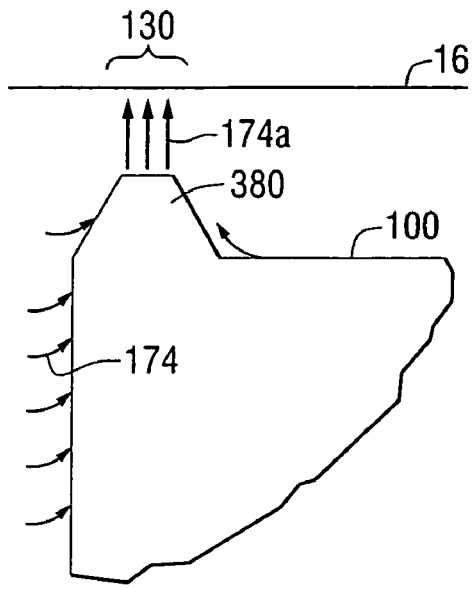
FIG. 10 is a two-dimensional partial sectional view of the three-dimensional protrusion of the ridge waveguide in accordance with the invention.
Figure 11:
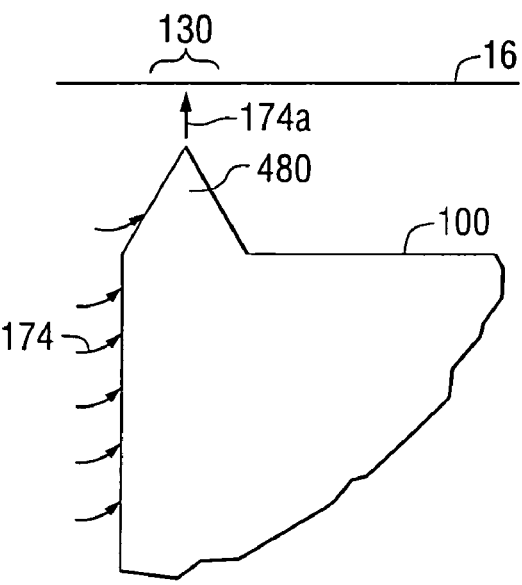
FIG. 11 is a two-dimensional partial sectional view of the three-dimensional protrusion of the ridge waveguide in accordance with the invention.
Figure 12:
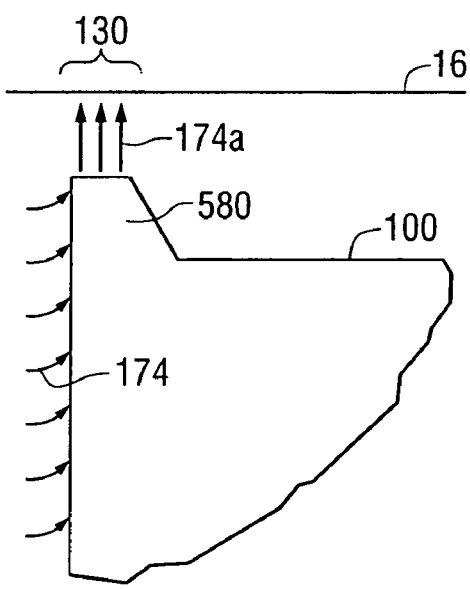
FIG. 12 is a two-dimensional partial sectional view of the three-dimensional protrusion of the ridge waveguide in accordance with the invention.
Figure 13:
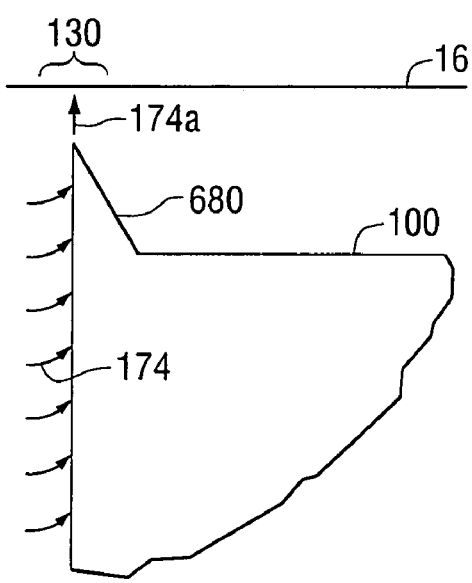
FIG. 13 is a two-dimensional partial sectional view of the three-dimensional protrusion of the ridge waveguide in accordance with the invention.
Figure 14:
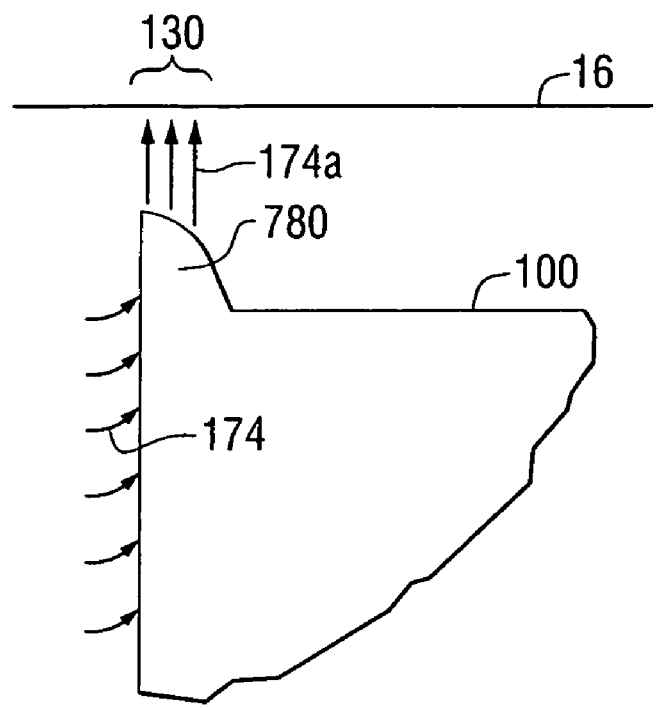
FIG. 14 is a two-dimensional partial sectional view of the three-dimensional protrusion of the ridge waveguide in accordance with the invention.
Figure 15:
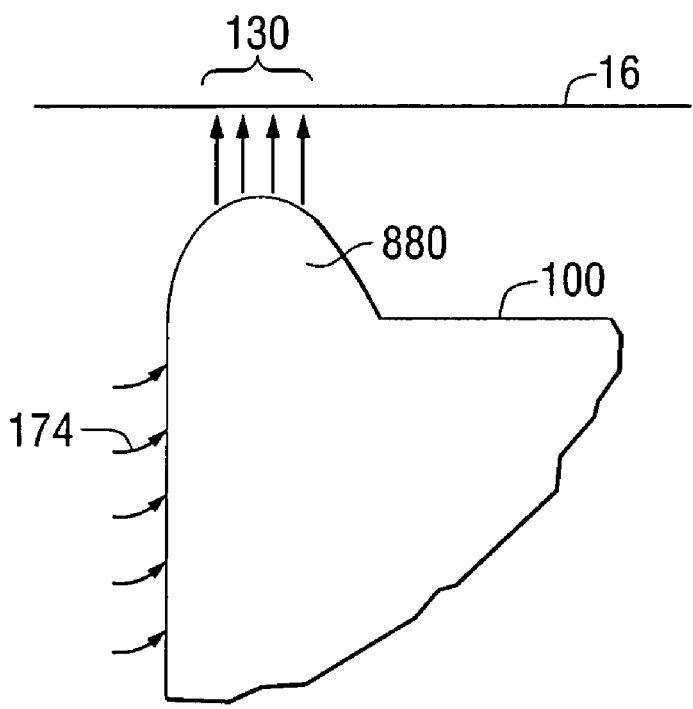
FIG. 15 is a two-dimensional partial sectional view of the three-dimensional protrusion of the ridge waveguide in accordance with the invention.

As shown in FIG. 10, the protrusion 380 can be angled to form an area of reduced cross-section. As shown in FIG. 11, the protrusion 480 comprises a point having two slanted sides. As shown in FIG. 12, the protrusion 580 can comprise a squared-off point. As shown in FIG. 13, the protrusion 680 can comprise a point having one slanted side. As shown in FIG. 14, the protrusion 780 can comprise a point having a rounded side. As shown in FIG. 15, the protrusion 880 can comprise a rounded area. Surface waves 174*a* focused to a point which will greatly increase the power density coupled into the media. In another example, the protrusion can comprise a thermal protrusion in the waveguide. A thermal protrusion can occur when a tip is heated causing a part of the tip to protrude from the surface due to thermal expansion.

Whereas particular examples of this invention have been described above for purposes of illustration, it will be evident to those skilled in the art that numerous variations of the details of the described examples may be made without departing from the invention as defined in the appended claims.

What is claimed is:

1. A transducer, comprising:
   a waveguide including a ridge and defining an aperture having an end lying in a plane; and
   a protrusion extending from the ridge beyond the plane.

2. The transducer of claim 1, wherein the waveguide comprises at least one of: a solid immersion lens and a solid immersion mirror.

3. The transducer of claim 1, further comprising a dielectric material comprising $Al_2O_3$, $SiO_2$, SiN or $Ta_2O_5$ in the aperture.

4. The transducer of claim 1, wherein the protrusion includes an end having a dimension of from about 10 nm to about 50 nm.

5. The transducer of claim 1, wherein at least one surface of the protrusion is angled with respect to the plane.

6. The transducer of claim 1, wherein at least one surface of the protrusion is tapered or curved to an area of reduced cross-section.

7. The transducer of claim 1, wherein the protrusion comprises gold, silver, aluminum, copper, cobalt, platinum, silver oxide or platinum oxide.

8. The transducer of claim 1, wherein the protrusion comprises a thermal protrusion.

9. A data storage system, comprising:
   a storage media;
   a positioning device for positioning a recording head adjacent to a surface of the storage media, wherein the recording head comprises:
      a write pole capable of transmitting electromagnetic radiation,
      a waveguide including a ridge and defining an aperture having an end lying in a plane, and
      a protrusion extending from the ridge beyond the plane; and
   a source of electromagnetic waves for delivering an electromagnetic wave to the waveguide.

10. The data storage system of claim 9, wherein the storage media is in optical communication with the aperture.

11. The data storage system of claim 10, wherein the storage media is spaced from about 3 nm to about 10 nm from the protrusion.

12. The data storage system of claim 9, wherein the waveguide comprises at least one of: a solid immersion lens and a solid immersion mirror.

13. The data storage system of claim 9, further comprising a dielectric material comprising $Al_2O_3$, $SiO_2$, SiN or $Ta_2O_5$ in the aperture.

14. The data storage system of claim 9, wherein the protrusion includes an end having a dimension of from about 10 nm to about 50 nm.

15. The data storage system of claim 9, wherein at least one surface of the protrusion is angled with respect to the plane.

16. The data storage system of claim 9, wherein the protrusion is tapered or curved to an area of reduced cross-section.

17. The data storage system of claim 9, wherein the protrusion comprises gold, silver, aluminum, copper, cobalt, platinum, silver oxide or platinum oxide.

18. The data storage system of claim 9, wherein protrusion comprises a thermal protrusion.

19. A recording head, comprising:
   a write pole capable of transmitting electromagnetic radiation;
   a waveguide positioned in the write pole and including a ridge and defining an aperture having an end lying in a plane; and
   a protrusion extending from the ridge beyond the plane.

20. The recording head of claim 19, wherein the protrusion includes an end having a dimension of from about 10 nm to about 50 nm.

* * * * *